Nov. 28, 1967     J. P. JONES, JR     3,355,731
ELECTRONIC TIMER UTILIZING CURRENT FLOW THROUGH
AN ELECTROLYTIC SOLUTION
Filed Jan. 27, 1965

INVENTOR
JOHN PAUL JONES, JR.

BY Watson, Cole, Grindle & Watson

ATTORNEYS

United States Patent Office 3,355,731
Patented Nov. 28, 1967

3,355,731
ELECTRONIC TIMER UTILIZING CURRENT FLOW THROUGH AN ELECTROLYTIC SOLUTION
John Paul Jones, Jr., 1401 Medford Road, Wynnewood, Pa. 19096
Filed Jan. 27, 1965, Ser. No. 428,425
6 Claims. (Cl. 340—309.1)

ABSTRACT OF THE DISCLOSURE

An electronic timer in the form of a calibrated wire plated away in an electrolyte solution whenever potential is applied until it breaks is described. The calibrated wire is protected from current flow of any significant value through an alarm circuit load during the plating time. The timer is sealed in a container and is protected against electrolysis when the wire breaks by a voltage limiting circuit across the wire keeping the potential below electrolysis voltage.

---

This invention relates to elecronic timers and more particularly to means for designating an elapsed time period in response to current flow through an electrolytic solution.

While many sorts of electronic timers have been proposed which indicate long time periods in the order of 100 or more hours, it has been difficult to provide accurate indications within a reasonable percentage of the elapsed time without use of electromechanical clock mechanisms which are subject to wear and corrosion or other expensive devices.

In the past electroplating techniques have been used for inexpensive timers to indicate elapsed time by visual inspection of a deposit built up by current flow through an electrolyte. Not only is a check with a scale or reference to determine the elapsed time period an inconvenient and inaccurate expedient, but such devices have had to rely on visual inspection and have not been used successfully as switching devices. If the timer mechanism itself is used to control an electronic circuit, there is a need for a positive instantaneous switching action at the elapsed time, which can operate at practical current and voltage values.

Accordingly, many potential uses of an electronic timer may be opened up if an inexpensive, reasonably accurate timer-switch is made available. For example, the need for servicing of an automobile can be indicated after a certain number of operating hours. With an inexpensive "one-shot" throw away timer-switch, the service station may conveniently install a unit which operates automatically to light an indicator lamp when the automobile is ready for servicing and replace the unit after servicing is completed. The same sort of device also can be installed in new electronic equipment to indicate the expiration of a warranty service period, and thus prevent excessive service costs that may be required where the length of actual time of use of such equipment is in doubt. In many cases the overall equipment cost would not justify installation of a relatively expensive timer, and installation of an inaccurate timer would not produce an acceptable indication of the actual elapsed time.

Accordingly, it is a general object of the invention to provide an inexpensive but accurate electronic timer, which may be used directly as a switch for controlling an alarm circuit.

Another object of the invention is to provide a novel method of accurate time measurement by electrolytic action.

A further object of the invention is to provide an electronic alarm system which automatically lights a lamp after a prescribed number of operating hours has expired.

Thus, in accordance with the invention, a time period is specified in accordance with Faraday's laws of electrolysis by plating off onto another body a carefully measured conductor mass with a constant current flow which provides the necessary quantity of electrical energy over a designated time period. In order to provide an inexpensive yet precise mass to determine the time period accurately, the mass of a calibrated conductive filament such as a copper wire is plated off onto another body until the wire is broken. Since wire is drawn to very precisely controlled dimensions, the time it takes to erode through such a wire with a constant current is accurately controlled. Also the erosion process serves to break the circuit through the conductor wire, so that the device may also be a self-contained switch, which acts positively and instantaneously at the elapsed time.

Electrolysis may take place in a conductive electrolyte when a voltage is developed across electrodes immersed therein. Thus, precautions are taken to prevent the timer leads from passing high currents or from encountering high voltages when the timing conductor is eroded away to produce a potential drop between the leads. Therefore, the timer when used in a system for controlling relatively high currents and voltages such as used for lighting a lamp is protected by shunting a low impedance device across the timer leads.

Other objects and features of the invention will be described in the following detailed description with reference to the accompanying drawing, wherein.

Figure 1:
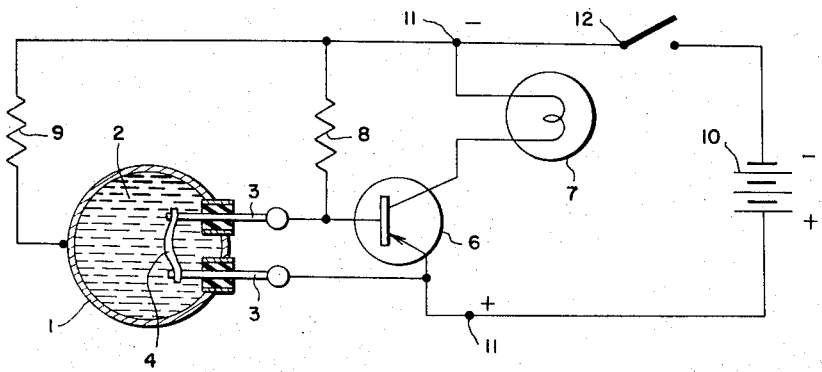
FIGURE 1 is a schematic circuit representation of an alarm system embodying the invention.
Figure 2:
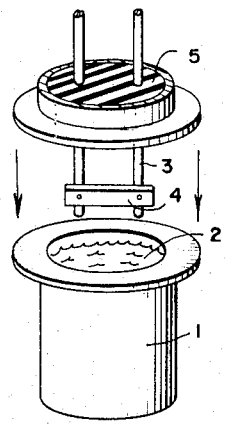
FIGURE 2 is a partially exploded view of a timing switch assembly afforded by the invention.

A typical alarm system incorporating the timer element provided by this invention is shown in FIGURE 1. The timer element itself is preferably a "one-shot" disposable element as shown in FIGURE 2. This element is contained in a metallic case 1, such as a transistor envelope, which is sealed onto insulating header 5 through which extends leads 3. Affixed between leads 3 inside the can 1, is a calibrated filamentary conductor 4, which may be a copper wire of known circumference. An electrolyte 2 is contained in case 1 so that the conductor 4 may be plated onto the metal of the case 1 when a current source is coupled between at least one of the leads 3 and the case 1. The leads 3 preferably are a nonplatable metallic conductor, for the electrolyte solution used so that the current flow will erode only conductor 4 away. Since the circumference can be held to close tolerances, the period of time taken to erode conductor 4 away and break the circuit between the leads 3 is constant with a constant current flow through the electrolyte.

A timer-switch of this time therefore may be connected into any typical electrical circuit having a fixed D-C potential source by means of a current limiting resistor and will thus accurately indicate the number of hours expended with the potential source connected to the circuit. If a warranty or an electrical device provides for 100 hours of operation, for example, and this device is installed with calibration for 100-hours of plating action to break conductor 4, a continuity tester at terminals 3 may be used when the device is presented for service to immediately establish whether the period had or had not expired.

When it is desired to automatically actuate an alarm circuit after the expiration of a predetermined time period, the circuit of FIGURE 1 may be employed.

This used the switching capabilities of the device, by sensing the difference in resistance between terminals 3 when conductor 4 is broken.

Figure 3:
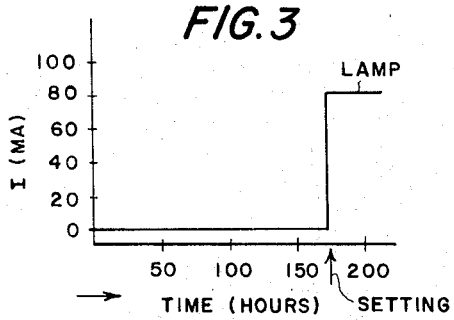
FIGURE 3 is a graph indicating the switching performance of the system of FIGURE 1.
Figure 4:
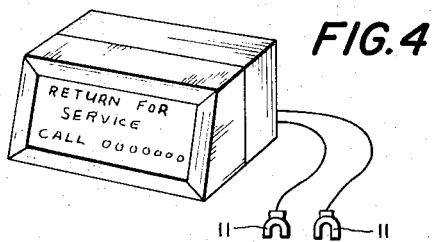
FIGURE 4 is a typical indicator embodying the invention.

In this system the potential of battery 10 is coupled for plating action through resistor 9 by switch 11. This may be the ignition switch and battery in an automobile, so that a simple external alarm device as shown in FIGURE 4 may be installed on the dashboard and connected by lead terminals 11 to the ignition key circuit. When the time period expires as indicated by breaking of conductor 4, the lamp 7 lights as shown by the graph of FIGURE 3. After servicing, only the inexpensive timer-switch element is replaced to indicate another time cycle.

Thus, the positive battery terminal is connected to a sensing lead 3 of the timer-switch element and the emitter of transistor 6. The other sensing lead 3 is decoupled from the negative battery terminal by base resistor 8 of transistor 6. This serves to switch on the transistor emitter collector current and light lamp 7 when the conductor 4 shorted from the base to emitter is broken, since the resistance of the electrolyte solution is high enough to develop an input voltage divided with resistor 8 across the battery 10.

This particular transistor circuit configuration provides efficient operation of this device when it is continuously in service with a potential across leads 3 which might cause electrolysis, since when switched on, the transistor 6 base to emitter path is a low resistance serving to reduce the voltage at leads 3 below electrolysis potential. Thus this switching circuit configuration both shunts the leads 3 to prevent electrolysis and senses the broken conductor 4 to light lamp 7.

When given a fixed battery potential such as a 12 volt automobile battery, the timing of the periods when using a standard filamentary conductor 4 may be established by the current limiting resistor 9 which thereby establishes the quantity of current flow through the electrolyte in accordance with Faraday's law.

Accordingly, the timing-switch device afforded by this invention has features of novelty representative of the nature of the invention defined with particularity in the appended claims.

What is claimed is:

1. Apparatus for accurately timing a period of energization of an electric circuit by electrolysis comprising in combination, an electrical conductor member having an accurately calibrated cross section, an electrolytic bath, a plating surface, a sealed case enclosing said bath and immersing therein said conductor and said surface, means establishing a constant current flow through said conductor on said plating surface, means limiting the potential across said conductor within said case to prevent electrolysis within said bath when continuity of said conductor is broken, and means determining the expiration of a predetermined time period by sensing the lack of continuity of said conductor member when it is eroded away and broken through by the plating action.

2. A timer-switch device comprising in combination, a sealed container having an electrolytic solution therein, a calibrated electrical conducor filament immersed in said solution, a plating member for receiving by electrolytic action portions of the conductor, a first set of connecting terminals for establishing a current flow path through said solution from the conductor to the plating member, a second set of terminals for sensing the continuity path of said conductor thereby indicating the time at which the conductor filament is broken by plating off on said plating member and means for limiting voltage at said second set of terminals below the electrolysis potential of said solution.

3. A device as defined in claim 2 wherein the container is a metallic can comprising said plating member and one of the terminals, and having a header mounted thereon with two terminals extending therethrough into the can to comprise the terminals for sensing continuity.

4. An alarm circuit for indicating elapsed time of operation of an electric circuit comprising in combination, a filamentary conductor having two leads, electrolytic plating means for plating from said conductor and including an electrolyte in which said conductor is immersed, means including a current source for passing a constant current through said conductor and said plating means during operation of said electric circuit, alarm means connected with a sensing circuit in parallel across said two leads and energized by said current source comprising a circuit drawing substantially no current until the breaking of the filamentary conductor by the plating action, a closed container enclosing said electrolyte and a switching circuit limiting potential between said leads to said filamentary conductor to prevent electrolysis in said electrolyte when the conductor is broken.

5. An alarm circuit as defined in claim 4 wherein the alarm means includes a transistor circuit having a base-to-emitter path connected as said sensing circuit across said two leads with a base resistor coupled to said current source to cause transistor emitter-to-collector current to flow when said filamentary conductor breaks in which event the potential across said base-to-emitter path remains at a level below the electrolysis potential of said electrolyte.

6. An alarm circuit as defined in claim 5 wherein a lamp is connected in the transistor emitter-to-collector path as a visible alarm indicator.

References Cited
UNITED STATES PATENTS

| | | | |
|---|---|---|---|
| 2,518,909 | 8/1950 | Krakauer | 324—68 |
| 2,791,473 | 5/1957 | Mattox | 58—1 X |
| 2,945,179 | 7/1960 | Winn | 324—68 |
| 3,045,179 | 7/1962 | Maier | 324—30 |
| 3,139,556 | 6/1964 | Grontkowski | 340—331 X |
| 3,175,055 | 3/1965 | Klapheke | 200—61.05 |
| 3,290,669 | 12/1966 | Mews | 324—68 |

NEIL C. READ, *Primary Examiner.*

I. J. LEVIN, H. I. PITTS, *Assistant Examiners.*